(12) United States Patent
Pedersen

(10) Patent No.: US 8,118,523 B2
(45) Date of Patent: Feb. 21, 2012

(54) SUPPORT SYSTEM FOR A WIND TURBINE COMPONENT, A VEHICLE TRANSPORT SYSTEM FOR A WIND TURBINE COMPONENT AND A METHOD FOR OPERATING A SUPPORT SYSTEM

(75) Inventor: Gunnar Kamp Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 206 days.

(21) Appl. No.: 12/528,657

(22) PCT Filed: Feb. 28, 2008

(86) PCT No.: PCT/DK2008/050050
§ 371 (c)(1),
(2), (4) Date: Dec. 15, 2009

(87) PCT Pub. No.: WO2008/104185
PCT Pub. Date: Sep. 4, 2008

(65) Prior Publication Data
US 2010/0111633 A1    May 6, 2010

(30) Foreign Application Priority Data
Feb. 28, 2007   (DK) ................................. 2007 00309

(51) Int. Cl.
*B60P 3/40* (2006.01)
(52) U.S. Cl. ........................................................ 410/44
(58) Field of Classification Search .................... 410/46, 410/47, 52; 414/458, 459
See application file for complete search history.

(56) References Cited

U.S. PATENT DOCUMENTS

| | | | |
|---|---|---|---|
| 3,243,193 A | | 3/1966 | Fulmer |
| 3,392,857 A | | 7/1968 | Tantlinger |
| 3,795,336 A | * | 3/1974 | Acker et al. ................... 414/458 |
| 4,199,298 A | * | 4/1980 | Webre et al. ................... 414/458 |
| 4,570,959 A | * | 2/1986 | Grinwald ................... 280/43.23 |
| 4,863,334 A | * | 9/1989 | Girerd ........................... 414/458 |
| 4,936,733 A | * | 6/1990 | Girerd ........................... 414/458 |

(Continued)

FOREIGN PATENT DOCUMENTS

| | | |
|---|---|---|
| AU | 40300 78 | 9/1980 |
| DE | 64 800 | 11/1968 |
| DE | 7401022 | 4/1974 |
| WO | WO 2004/041589 | 5/2004 |
| WO | WO 2004/101313 | 11/2004 |
| WO | WO 2006/000230 | 1/2006 |

*Primary Examiner* — H Gutman
(74) *Attorney, Agent, or Firm* — Wood, Herron & Evans, L.L.P.

(57) ABSTRACT

The invention relates to a support system for a wind turbine component with a rigid structure such as a wind turbine nacelle or a section of a wind turbine tower. The support system comprises a plurality of engagement mechanisms (6, 7, 8, 9) defining at least three corners, possibly at least four corners, of a surface. The surface, in case of the support system comprising at least four engagement mechanisms, is capable of forming a curved surface, and the surface, in case of the support system comprising at least three engagement mechanisms, is at least capable of being tilted in relation to e.g. a vertical orientation. Further, the invention includes a method for operating the support system by simultaneously operating the lower and upper telescopic actuator on each of the support systems, so that the wind turbine component can be lifted or lowered.

37 Claims, 11 Drawing Sheets

U.S. PATENT DOCUMENTS

| | | | |
|---|---|---|---|
| 5,006,031 A * | 4/1991 | Fossing et al. | 414/458 |
| 5,791,856 A * | 8/1998 | Kosonen et al. | 414/458 |
| 6,821,066 B2 * | 11/2004 | Wehrli | 410/32 |
| D535,454 S * | 1/2007 | Wareham | D34/28 |
| 7,775,753 B2 * | 8/2010 | Pedersen | 410/44 |
| 2004/0091346 A1 | 5/2004 | Wobben | |

* cited by examiner

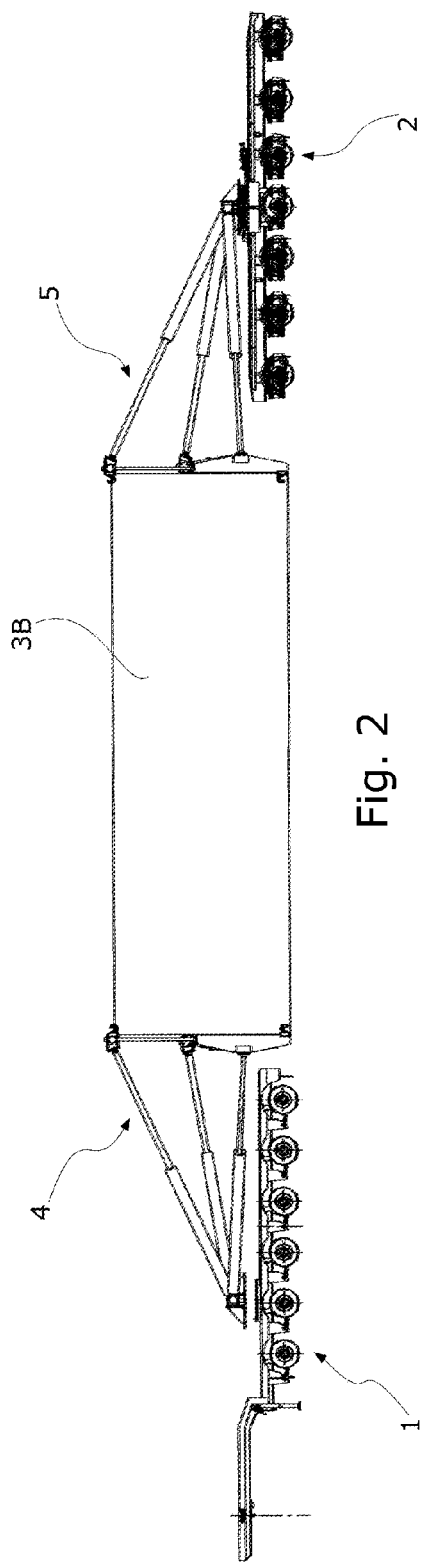
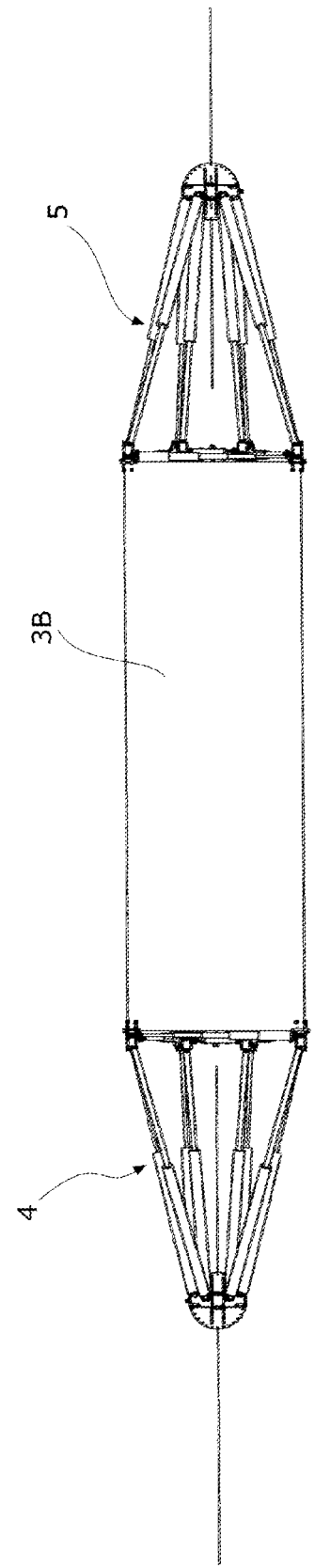
Fig. 2
Fig. 3

SUPPORT SYSTEM FOR A WIND TURBINE COMPONENT, A VEHICLE TRANSPORT SYSTEM FOR A WIND TURBINE COMPONENT AND A METHOD FOR OPERATING A SUPPORT SYSTEM

PRIORITY CLAIM

This is a U.S. national stage of application No. PCT/DK2008/050050, filed on Feb. 28, 2008. Priority is claimed on Denmark Application No. PA 200700309, filed Feb. 28, 2007, the entire content of which is incorporated herein by reference.

FIELD OF THE INVENTION

The invention relates to a support system for a wind turbine component with a rigid structure such as a wind turbine nacelle or a section of a wind turbine tower. The invention also relates to a vehicle transport system for a wind turbine component with a rigid structure. Furthermore, the invention relates to a method of operating a support system.

BACKGROUND OF THE INVENTION

Today, the magnitude of wind turbine components is very large. Therefore special equipment may be needed when transporting the wind turbine component between different locations such as between the site of manufacture and to a site for shipping or from a site for shipping to a site of installation of the wind turbine.

Wind turbine components such as nacelles or tower sections are transported to the mounting site and between loading and unloading sites by means of large trucks capable of carrying the relevant load on standard trailers, or more preferred, on specialized trailers. Before the truck transportation to e.g. the mounting site, the components may be transported from the central wind turbine production plant by vessels other than trucks such as by ship or by train or even in very special circumstance by aeroplane.

As the wind turbine components often are, or at least may be, quite large and heavy as well as quite irregular in shape, the transportation usually requires a lot of transportation space, e.g. on a trailer of a truck. Furthermore, the components often require special handling and handling equipment due to the heavy load and/or the irregular shape.

US2004/091346 discloses a device for gripping a unit load during handling of same. A vertically disposed base frame has two vertical stays and horizontal traverses. On either side of the lower horizontal traverse, extension arms with hydraulic cylinders can be telescopically withdrawn and extended in the direction of the traverse (horizontally and laterally thereto). In the vertical stays there are stay extensions that can similarly be withdrawn and extended with the aid of hydraulic cylinders in the longitudinal direction of the vertical stays (vertically upwards). A crossbeam may also enable telescopic adjustment such that, in addition to hydraulic (or pneumatic) adjustment of the height, the horizontal lateral position of upper container brackets can also be adapted to the transportation load. Thus, the container brackets may be displaced within the vertical plane of the vertically disposed base frame, horizontally or vertically to be adapted to the transportation load.

WO2004/101313 discloses a transporting system for a wind turbine component by means of a truck. Standardization means having end walls define a four-sided space capable of enclosing the wind turbine component. Upper and lower beams of the standardization means are standard beams of a shipping container including the openings for the above mentioned lashing equipment. First and second frame standardization means are connected to a first and second connection vehicle for a wind turbine component. The connections are established at lower ends with hinged connections, and at upper ends with lift actuators allowing the wind turbine component to be lifted from the ground. Thus, the lift actuators are only established for ensuring the possibility of lifting the wind turbine component form the ground. The positions of the connections are standardized.

WO 2004/041589 discloses a method for supporting on an undercarriage an end of a self-supporting load, in particular a tower section. The end of the load is engaged directly by one lower and one upper support, which supports are connected to the undercarriage and enclose and angle in a vertical plane. The angle between the supports can herein be adapted to the dimensions of the end of the load. The device is provided with a lower and an upper support which enclose an angle with each other in a vertical plane. The supports are each connected with one end to the undercarriage, and the other end of the supports is adapted to engage on the end of the load. The three or four outer ends of the supports constitute a plane surface, either a triangular or a rectangular plane surface.

SUMMARY OF THE INVENTION

It may be an object of the present invention to provide a support system and a vehicle transport system, which are much more adaptable to the different components of a wind turbine such as a nacelle or a tower section, but which are also much more adaptable to the different constructional constraints of each of the components of a wind turbine.

The object may be obtained by a support system where an individualized support is arranged for being directly or indirectly connected to the rigid structure of said wind turbine component, where a plurality of engagement mechanisms of the at least one individualized support defines at least four corners of a surface, where at least a number of the engagement mechanisms are displaceable in relation to a reference support of said at least one individualized support system, where said surface is tiltable in relation to the reference support, where the support system comprises at least four engagement mechanisms, and where the surface is capable of forming a curved surface by displacement of at least one engagement mechanism.

The surface, either plane or curved, being tiltable increases the possibilities of the engagement mechanisms being capable of engaging with the rigid structure of the wind turbine component. Thus, the rigid structure may possibly be constructed without any constructional restraints on the need for suspending and transporting the component.

The object may also be obtained by a support system where an individualized support is arranged for being directly or indirectly connected to the rigid structure of said wind turbine component, where a plurality of engagement mechanisms of said at least one individualized support defines at least three corners of a surface, where at least a number of said engagement mechanisms are displaceable in relation to a reference support of said at least one individualized support, and where said surface is tiltable in relation to the reference support, and where the support system comprises only three engagement mechanisms, and where the surface is a plane surface, where two of the three engagement mechanisms are mutually connected via at least one displacement mechanism extending from one of the two engagement mechanisms to the other of the two engagement mechanisms, and where at least one of the plurality of engagement mechanisms furthermore is connected to the reference support via at least one further telescopic actuator.

The plane surface being tiltable and at least two engagement mechanisms being displaceable by means at least one displacement mechanism extending from one of the two engagement mechanisms to the other of the two engagement mechanisms also increases the possibilities of the engagement mechanisms being capable of engaging with the rigid structure of the wind turbine component. Thus, also in an embodiment with only three engagement mechanisms, the rigid structure may possibly be constructed without any constructional restraints on the need for suspending and transporting the component.

The object is also obtained by a vehicle transport system with an individualized support intended for being directly or indirectly connected to the rigid structure of said wind turbine component, said at least one individualized support further being connected to said at least one trailer in one or more movable connections of a reference support, where engagement mechanisms of said at least one individualized support define at least three, preferably at least four corners of a surface, where at least a number of said engagement mechanisms are displaceable in relation to a reference support placed on the at least one trailer of the vehicle transport system, and where said surface is tiltable around an axis in relation to the reference support and thus also being tiltable around an axis in relation to the at least one trailer According to one aspect of the vehicle transport system according to the invention, each of the individualized supports comprises at least four engagement mechanisms, and the surface is capable of forming a curved surface by displacement of at least one engagement mechanism.

According to another aspect of the vehicle transport system, each of the individualized supports comprises only three engagement mechanisms, and the surface being defined by the at least three engagement mechanisms is a plane surface, where two of the three engagement mechanisms are mutually connected via a displacement mechanism extending from one of the two engagement mechanisms to the other of the two engagement mechanisms, and where at least one of the three engagement mechanisms furthermore is connected to the reference support via at least one further telescopic support actuator.

The surface, either plane or curved, being tiltable increases the possibilities of the wind turbine component being suspended and transported based on individualized needs, so that the engagement mechanisms are capable of engaging with the rigid structure of the wind turbine component, and thus the vehicle transport system may be operated more freely in relation to the type of vehicle, the size of the vehicle and the route followed by the vehicle.

Different surfaces are obtainable by the present invention. The mutual freedom of movability of the engagement mechanisms engaging the rigid structure of the wind turbine component depends on the number of engagement mechanisms and on the degree of movability possessed by each of the engagement mechanisms in relation to the other engagement mechanisms and in relation to the reference support.

Thus, the support system may comprise only three engagement mechanisms, the surface defined by the at least three engagement mechanisms being a plane surface. Alternatively, the support system may comprise at least four engagement mechanisms, and the surface being defined by the at least four engagement mechanisms may be provided as a curved surface. By displacing at least one of the engagement mechanisms the surface can be provided as a curved surface, but need not be provided as a curved surface. The extension of the surface, i.e. plane or curved, depends on the position of corresponding engagement mechanisms of the load to be supported.

Possibly, at least two of the engagement mechanisms are mutually connected via a displacement mechanism such as at least one telescopic actuator, and at least one of the plurality of engagement mechanisms is furthermore intended for being connected to a reference support via said at least one telescopic actuator.

Alternatively, all of the engagement mechanisms are mutually connected via a displacement mechanism extending from one of the two engagement mechanisms to another of the two engagement mechanisms, and at least one of the plurality of engagement mechanisms is furthermore intended for being connected to a reference support via said at least one telescopic support actuator.

Even more alternatively, at least two of the engagement mechanisms are mutually connected via a displacement mechanism such as at least one telescopic actuator, and all of the plurality of engagement mechanisms is furthermore intended for being connected to a reference support via said at least one telescopic support actuator.

In a preferred embodiment of the support system according to the invention, said at least one telescopic support actuator comprises at least one lower telescopic support actuator and at least one upper telescopic support actuator. By providing an upper and also a lower telescopic support actuator, the possibility increases of mutually displacing all, or perhaps just one, of the at least three engagement mechanisms in relation to the reference support. Also, lift and subsequent suspension of the wind turbine component is eased with reference to the method according to the invention of operating the support system.

According to an aspect of a mechanism for mutual displacement of two or more of the engagement mechanisms, at least two of the engagement mechanisms, preferably two lower engagement mechanisms, are mutually connected via a knee-joint, and at least one first telescopic actuator is arranged for operating said knee-joint for thereby displacing the at least two engagement mechanisms in relation to each other. A knee-joint is a robust and mechanically stable connection mechanism. Also, the force needed for displacing the at least two engagement mechanisms may be reduced when displacing the at least two engagement mechanisms along a knee-joint.

According to an additional or an alternative aspect of mutual displacement of two or more of the engagement mechanisms, at least two of the engagement mechanisms, preferably two upper or two lower engagement mechanisms, are mutually and directly connected via at least one second telescopic actuator extending from one of the at least two engagement mechanisms to another of the at least two engagement mechanisms, said at least one second telescopic actuator being intended for displacing the at least two engagement mechanisms in relation to each other. A telescopic actuator is a reliable and easily operated mechanism for displacing the at least two engagement mechanisms. Furthermore, mutual displacement may take place fast and along a distance only being limited by the maximum stroke of the telescopic actuator.

According to a preferred aspect of the vehicle transport system according to the invention, said one or more movable connections of the reference support comprises hinged connections between the individualized support and the at least one trailer. Hinging the reference support to the trailer ensures that the reference support may pivot in relation to the trailer.

The movability of the reference support, and consequently of the wind turbine component in relation to the trailer is thereby ensured when the wind turbine component is suspended and transported.

The one or more movable connections between the reference support and the at least one engagement mechanism further comprise at least one support actuator for actuating a displacement of one or more of the engagement mechanisms in relation to the reference support. A support actuator is an actuator extending between the reference support and one or more of the engagement mechanisms. Thus, the support actuator is primarily intended for and is capable of displacing the one or more engagement mechanisms in relation to the reference support, and is not primarily, although possibly capable of, intended for displacing two or more engagement mechanisms in relation to each other.

According to an aspect of the invention, said at least one telescopic support actuator between the reference support of the trailer and the engagement mechanisms includes at least one, preferably at least two, telescopic support actuators being movably connected to the at least one trailer with lower engagement mechanisms of said at least one individualized support. Such telescopic support actuators will extend from the reference support to a limited number of the engagement mechanisms, namely a number of lower engagement mechanisms.

According to another or an additional aspect of the invention, said at least one telescopic support actuator between the reference support of the trailer and the engagement mechanism includes at least one, preferably at least two, telescopic support actuators being movably connected to the at least one trailer with upper engagement mechanisms of said at least one individualized support. Such telescopic support actuators will extend from the reference support to a limited number of the engagement mechanisms, preferably to a number of upper engagement mechanisms.

When having telescopic support actuators extending between the reference support and lower engagement mechanisms and between the reference support and the upper engagement mechanisms, respectively, the invention leads to a new method of operating a support system, said method also constituting an aspect of the invention.

The method according to the invention involves the following steps:
  providing at least one support system at a vehicle at one end of the wind turbine component and providing at least another support system at a vehicle at another end of the wind turbine component, said vehicle being intended for transporting the wind turbine component,
  providing at least three engagement mechanisms of each support system, said at least three engagement mechanisms being directly or indirectly connected to the rigid structure of said wind turbine component,
  providing at least one lower telescopic support actuator and at least one upper telescopic support actuator at each of the support systems, between the at least three engagement mechanisms, respectively, and the reference support of the vehicle,
  simultaneously operating said at least one lower telescopic support actuator and said at least one upper telescopic support actuator of both the one and the other support system, thereby lifting the wind turbine component from a lower level to a higher level, alternatively lowering the wind turbine component from a higher level to a lower level.

Thus is obtained an easy and safe method of lifting the wind turbine component from the ground or from any other basis, on which the wind turbine component is resting, said method leading directly to a subsequent suspension of the wind turbine component by the support system according to the invention, and said suspension leading directly to a subsequent transportation by the vehicle transport system according to the invention.

Depending on the geometrical and constructional design of the support system, the method for lifting or lowering takes place by either one of the following aspects of the method:

Either, the step of simultaneously operating the telescopic support actuators is performed by extending the at least one lower telescopic support actuator and retracting the at least one upper telescopic support actuator of both the one and the other support system.

Alternatively the step of simultaneously operating the telescopic actuators is performed by retracting said at least one lower telescopic support actuator and extending said at least one upper telescopic support actuator of both the one and the other support system.

BRIEF DESCRIPTION OF THE DRAWINGS

FIG. 1-3 schematically show a load being suspended on a vehicle according to the invention, between individualized supports according to the invention and placed on trailers of the vehicle.

DETAILED DESCRIPTION OF THE INVENTION

Figure 1:
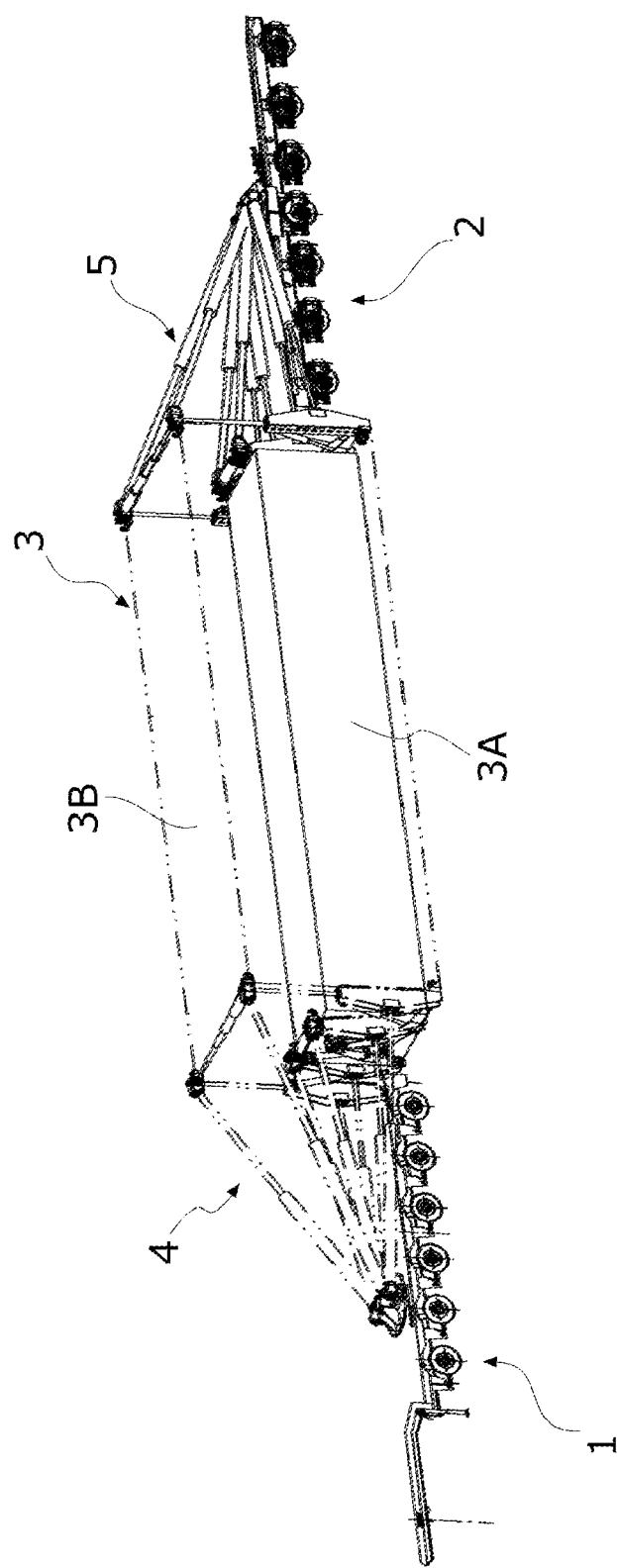

FIG. 1-3 shows a vehicle consisting of a front trailer 1 intended for being connected to a hauling truck (not shown), possibly trough a connection such as a king-pin, and a rear trailer 2, also being intended for being hauled by the truck via the front trailer 1 and via a wind turbine component 3 being suspended between the front trailer 1 and the rear trailer 2. In an alternative configuration, the front trailer 1 does not constitute a trailer as such, but constitutes part of the hauling truck. Thus, in such a situation, the only actual trailer is the rear trailer 2.

The wind turbine component 3 being suspended between the front trailer and the rear trailer may be a nacelle, a segment of a wind turbine tower, a wind turbine blade or one or more other components for a wind turbine. In the figure, a box-like shape is used for illustrative purposes as the wind turbine component 3. The box-like shape may be any different component of a wind turbine, but the box-like shape may also be a container for transporting components of a wind turbine. In the remainder of the description, the wind turbine component or container to be supported and to be transported will generally be denoted a 'load' to be supported and transported.

The load 3 is suspended in individualized supports 4,5 of the front trailer 1 and of the rear trailer 2. The individualized supports 4,5 are provided with engagement mechanisms 6,7, 8,9 for engagement with corresponding dedicated engagement mechanisms (not shown) of the load 3. The dedicated engagement mechanisms primarily serve the purpose of engaging with the engagement mechanisms of the individualized supports 4,5, or with constructional parts of the load 3. The constructional parts primarily serve a purpose other than engaging with the engagement mechanisms 6,7,8,9 of the individualized supports 4,5.

The engagement mechanisms 6,7,8,9 of the individualized supports 4,5 may be adjusted sideways and upwards/downwards in the plane of FIG. 2 and FIG. 3. This is illustrated in FIG. 6-37. Either a relatively small-sized load 3A, as shown by full lines, is suspended between the individualized supports, or a relatively large-sized load 3B, as shown by dotted lines, is suspended between the individualized supports 4,5. When the relatively small-sized load 3A is supported, the individualized supports 4,5 are more or less collapsed, and the engagement mechanisms 6,7,8,9 constitute a small rectangle. When the relatively large-sized load 3 is supported, the individualized supports 4,5 are more or less expanded, and the engagement mechanisms 6,7,8,9 constitute a large rectangle.

In the figures, both the front individualized support 4 and the rear individualized support 5 are shown either being in a more or less collapsed state, when the small-sized load 3A is suspended, or being in a more or less expanded state. In other possible situations, the front individualized support 4 may be more or less collapsed, while at the same time the rear individualized support 5 is more or less expanded, and vice versa. The degree of collapse or expansion of the front individualized support 4, while at the same time the rear individualized support 5 is being more or less collapsed or expanded, depends on the geometry and the size of the front and the rear of the load to be suspended and transported.

Figure 4:
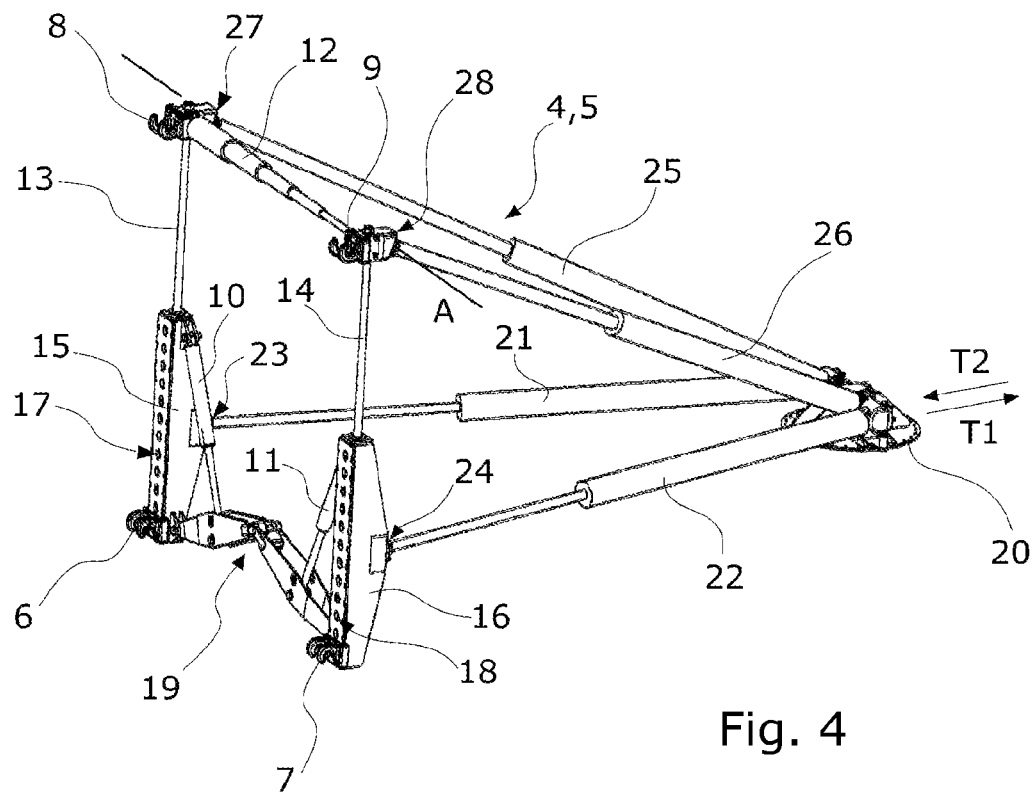
FIG. 4 shows in perspective an embodiment of an individualized support according to the invention, in a fully expanded state in relation to suspending a load in four engagement mechanisms of the support.
Figure 5:
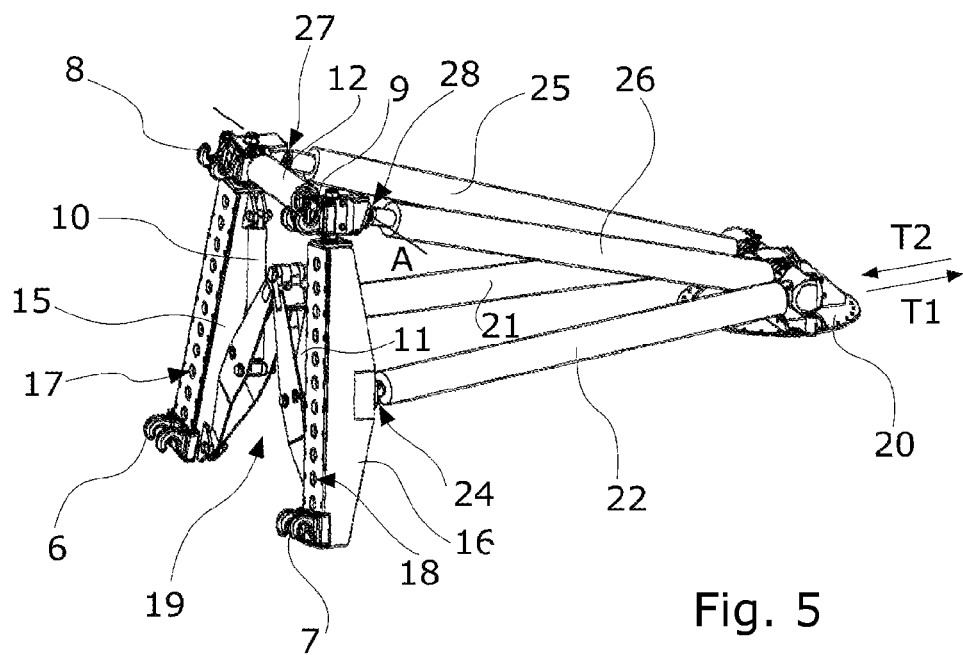
FIG. 5 shows in perspective an embodiment of an individualized support according to the invention, in a fully collapsed state in relation to suspending a load in four engagement mechanisms of the support.
Figure 6:
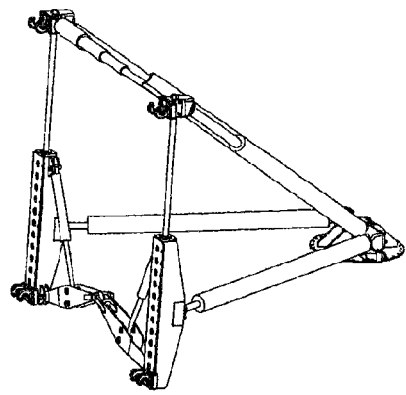
FIG. 6-37 show different individual more or less expanded or collapsed states of the support system according to the invention in relation to suspending a load in four engagement mechanisms of the support.
Figure 7:
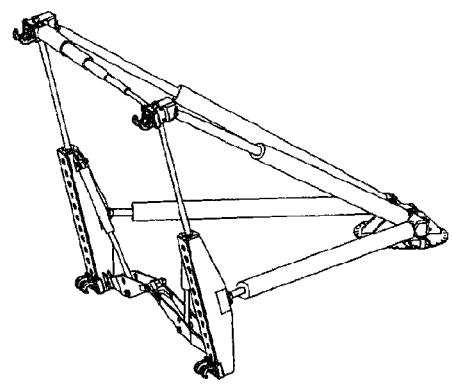
Figure 8:
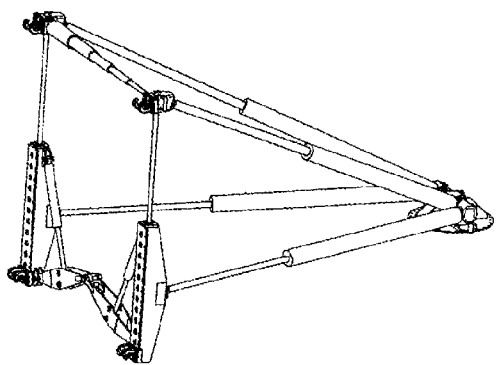
Figure 9:
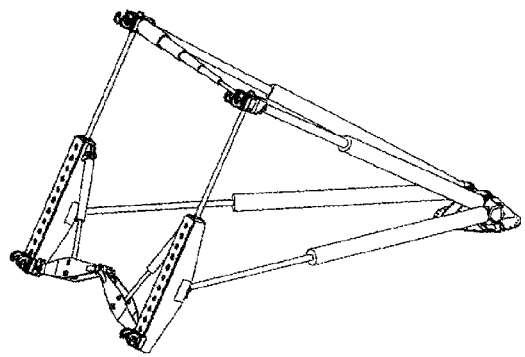
Figure 10:
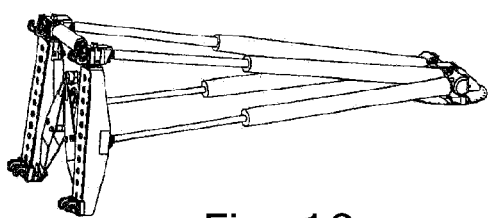
Figure 11:
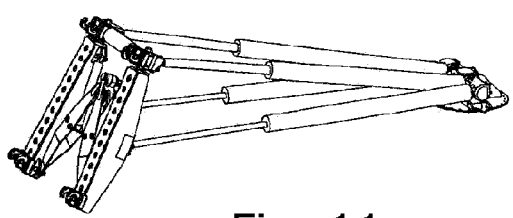
Figure 12:
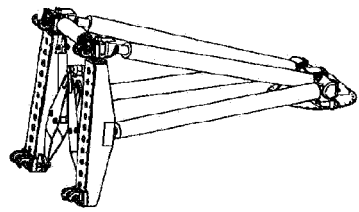
Figure 13:
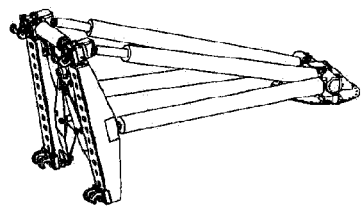
Figure 14:
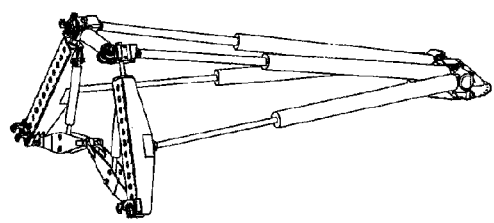
Figure 15:
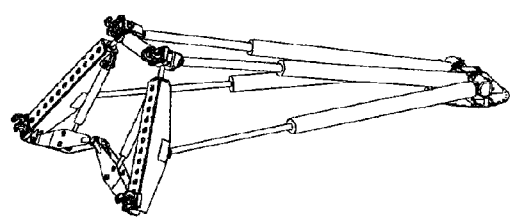
Figure 16:
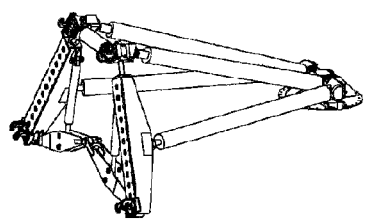
Figure 17:
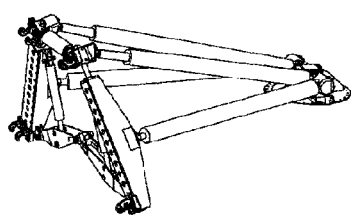
Figure 18:
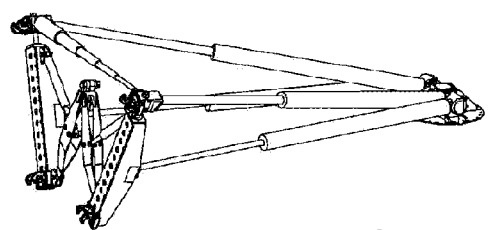
Figure 19:
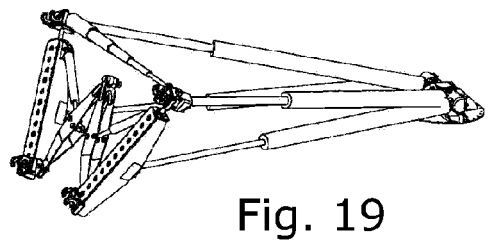
Figure 20:
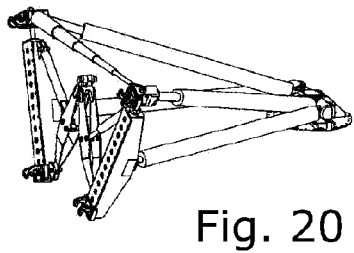
Figure 21:
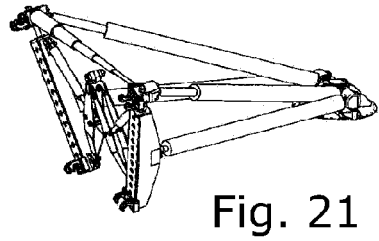
Figure 22:
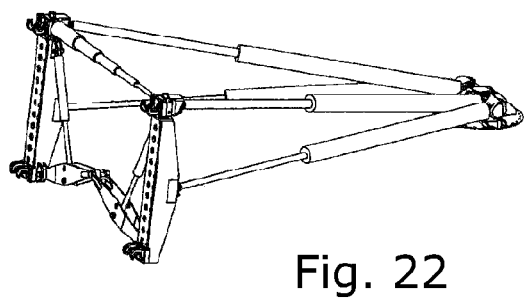
Figure 23:
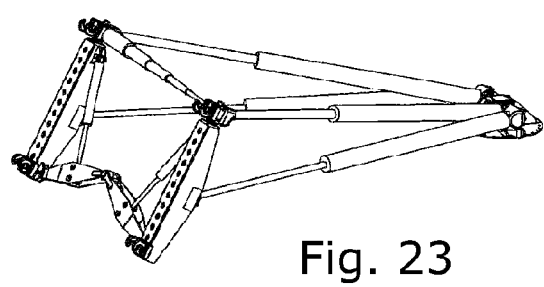
Figure 24:
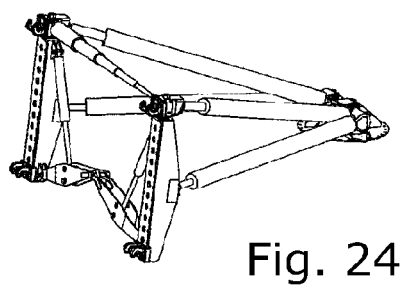
Figure 25:
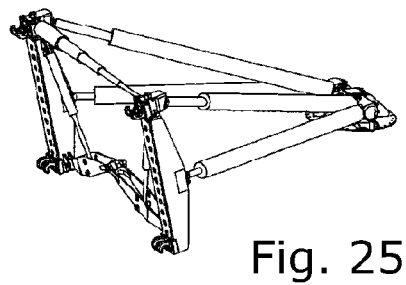
Figure 26:
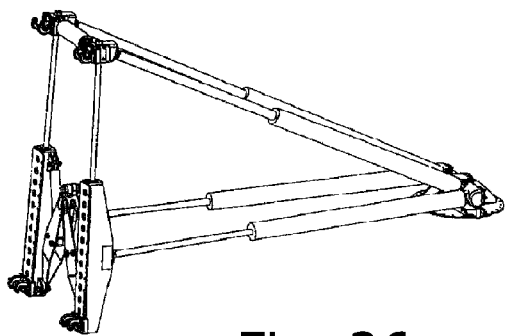
Figure 27:
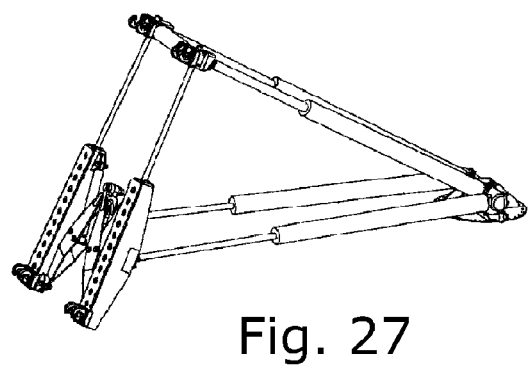
Figure 28:
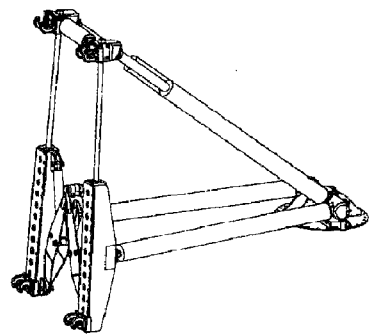
Figure 29:
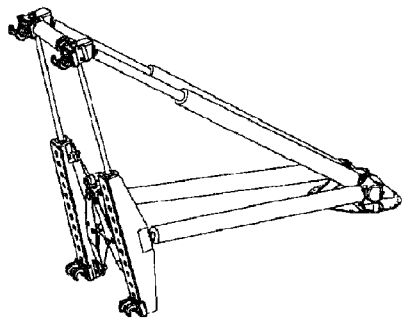
Figure 30:
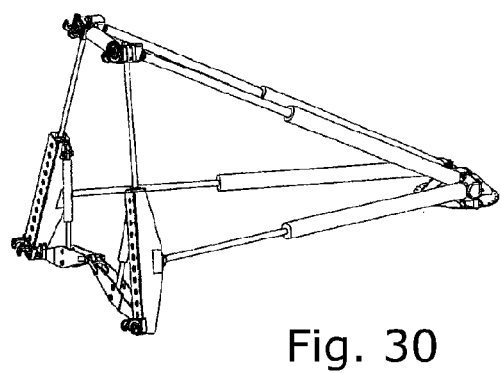
Figure 31:
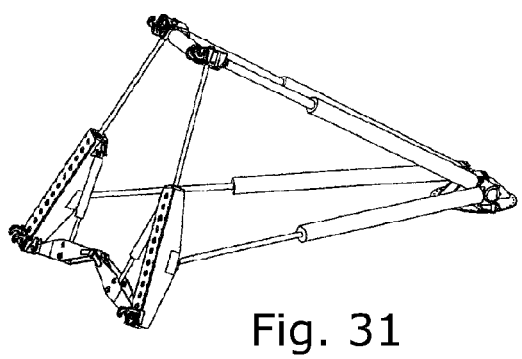
Figure 32:
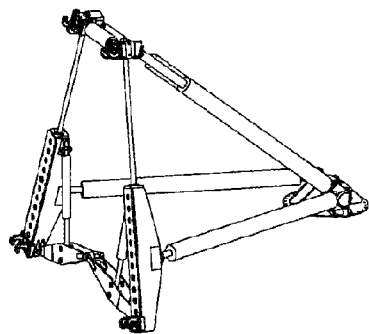
Figure 33:
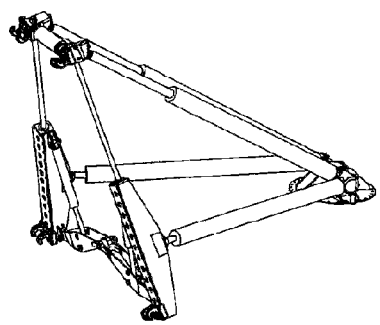
Figure 34:
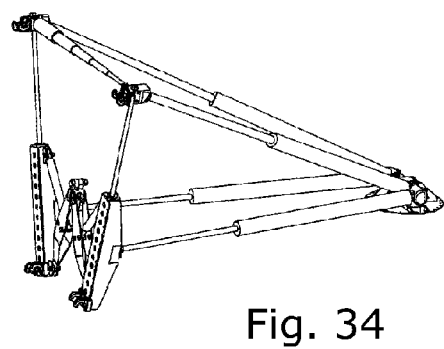
Figure 35:
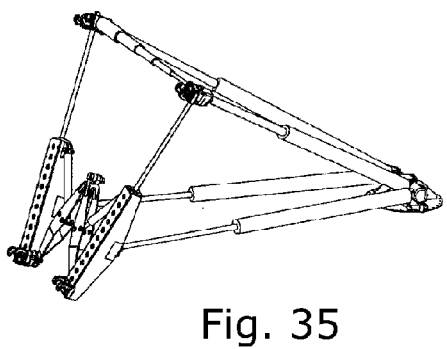
Figure 36:
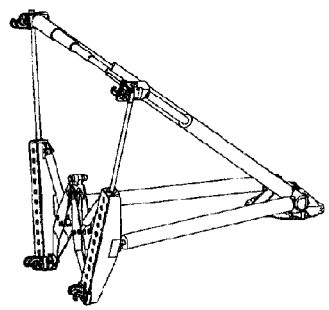
Figure 37:
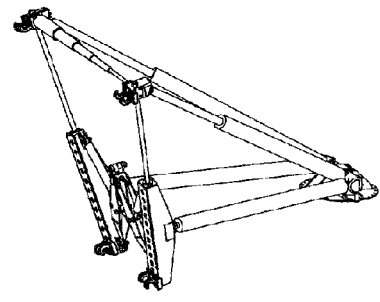

FIG. 4-5 show a possible and preferred embodiment of an individualized support 4,5. FIG. 4 shows the individualized support in a fully expanded state, corresponding to carrying a large-sized load 3B (see FIG. 1-3). FIG. 5 shows the individualized support in a fully collapsed state, corresponding to suspending a small-sized load 3A (see FIG. 1-3).

The support 4,5 is provided with four engagement mechanisms 6,7,8,9 in outer corners of the substantially rectangular plane surface defined by the engagement mechanisms 6,7,8,9. The engagement mechanisms 6,7,8,9 may also be provided within the support so that more or less of the outer periphery of the support is not provided with engagement mechanisms, but may be adapted for other purposes. The other purposes may be protective encasing purposes of perhaps a wind turbine blade constituting the load, the engagement mechanisms being provided within the boundaries of such possible encasement.

In an alternative embodiment, the support 4,5 is provided with only three engagement mechanisms in outer corners so that a triangular plane surface is defined by the engagement mechanisms. This may very well be the case where a wind turbine tower section constitutes the load, and where the engagement mechanisms engage with a flange, or engage with an inner surface or an outer surface of the wind turbine tower section.

In another alternative embodiment, the support 4,5 is provided with more than four engagement mechanisms in outer corners so that a polygonal surface with more than four corners is defined by the engagement mechanisms 6,7,8,9. The embodiments of surfaces having four or more corners may be plane or may be curved. If possibly one or more of the engagement mechanisms is displaced out of the plane, the surface thus defined by the engagement mechanisms will not be plane, but the surface defined will be curved.

In the remainder of the description, a support having four engagement mechanisms 6,7,8,9, and provided in corners of the support 4,5, will be used as an example of the above-mentioned possible embodiments. Furthermore, as an example, the four engagement mechanisms 6,7,8,9 will be described as defining a surface being plane and being delimited by the four engagement mechanisms 6,7,8,9. However, as will be apparent by the description of the possible embodiments, all the embodiments allow the surface defined by the four engagement mechanisms 6,7,8,9 to be non-plane, i.e. to be curved.

As will appear from FIG. 6-37, the plane surface may have shapes other than substantially rectangular, i.e. the shapes may also be upwards or downward tapering trapezoidal shapes. As mentioned above, apart from being non-rectangular, the surface may also be curved and may be sloping forwards or rearward along part of the surface or along the entire surface defined by the four engagement mechanisms 6,7,8,9.

Mutual displacement between the engagement mechanisms 6,7,8,9 of the support is provided by first telescopic actuators 10,11, by second telescopic actuators 12 and by third telescopic actuators 13,14. The telescopic actuators 10,11,12,13,14 have different characteristics depending on the mutual relationship between the engagement mechanisms 6,7,8,9 that the specific telescopic actuator 10,11,12,13,14 is intended for actuating.

First telescopic actuators 10,11 are provided for mutually displacing the two lower engagement mechanisms 6,7. The two lower engagement mechanisms 6,7 are provided at a lowermost location of lower individual support racks 15,16. The lower support racks 15,16 are provided with a plurality of holes 17,18 intended for displacing the lower engagement mechanisms 6,7 to higher locations along the lower support racks 15,16. Thereby, non-dependent on any mutual incremental displacement of the two lower engagement mechanisms 6,7 by means any of the telescopic actuators 11,12,13, 14, the two lower engagement mechanisms 6,7 may be displaced stepwise along the lower support racks 15,16 and fixed to a hole 17,18 of the support racks 15,16 at a higher location than shown.

Furthermore, one of the lower engagement mechanisms 6,7, i.e. either the right or the left one, may be fixed to a hole 17,18 of the one support rack 15,16, this hole being different from a hole 18,17 of the other support rack 16,15 to which the other lower engagement mechanisms 7,6 are fixed.

A knee-joint 19 is provided between the two support racks 15,16, and the first telescopic actuators 10,11 are cooperating with the knee-joint 19 for mutually displacing the knee-joint 19 downwards or upwards, and thus mutually displacing the lower engagement mechanisms 6,7.

When either one or both of the first telescopic actuators 10,11 are extended, the knee-joint 19 will be displaced downwards, and the lower engagement mechanisms 6,7 will be displaced away from each other. Depending on whether only one of the first telescopic actuators, 10 or 11, or both of the first telescopic actuators, 10 and 11, are extended, only one of the lower engagement mechanisms, 6 or 7, or both of the lower engagement mechanisms, 6 and 7, respectively, will be displaced sideway in a direction away from the other lower engagement mechanism.

When either one, of or both, of the first telescopic actuators 10,11 are retracted, the knee-joint 19 will be displaced upwards, and the lower engagement mechanisms 6,7 will be displaced towards each other. Depending on whether only one of the first telescopic actuators, 10 or 11, or both of the first telescopic actuators, 10 and 11, are retracted, only one of the lower engagement mechanisms, 6 or 7, or both of the lower engagement mechanisms, 6 and 7, respectively, will be displaced sideway in an a direction towards the other lower engagement mechanism.

A second telescopic actuator 12 is provided for mutually displacing the two upper engagement mechanisms 8,9. The two upper engagement mechanisms 8,9 are provided at the uppermost location of the individualized support 4,5. When the second telescopic actuator 12 is extended, the upper engagement mechanisms 8 and 9 will be displaced away from each other, and when the second telescopic actuator 12 is retracted, the upper engagement mechanisms 8 and 9 will be displaced towards each other.

In a possible alternative embodiment (not shown), the two upper engagement mechanisms are provided at the uppermost location of second individual support racks (not shown) similar to the support racks 15,16 shown with reference to the lower engagement mechanisms 6,7.

The possible second support racks (not shown) for the upper engagement mechanisms 8,9 may also be provided with a plurality of holes intended for displacing the upper engagement mechanisms to lower locations along the possible second support racks.

Thereby, non-dependent on any mutual infinite displacement of the two upper engagement mechanisms by means of any of the telescopic actuators, the two upper engagement mechanisms may be displaced along the possible upper support racks and fixed to a hole of the support rack at a lower location. Thus, the one upper engagement mechanism may be fixed to a hole of the one possible upper support rack, the hole being different from a hole of the other possible support rack to which hole the other upper engagement mechanism is fixed.

A knee-joint (not shown) may then also be provided between the two possible upper support racks. If a knee-joint is also provided between the two possible upper support racks, the second telescopic actuator 12 will be replaced by at least two second telescopic actuators corresponding to the first telescopic actuators 10,11. The possible two telescopic second actuators will be cooperating with the possible knee-joint for mutually displacing the upper engagement mechanisms 8,9.

As an alternative to only the lower engagement mechanisms 6,7 being connected to each other through a knee-joint 19, and alternatively to both the lower engagement mechanisms 6,7 being connected, and also the upper engagement mechanisms being connected, through a lower knee-joint and a possible upper knee-joint, only the upper engagement mechanisms may be connected to each other through a possible upper knee-joint.

Third telescopic actuators 13,14 are provided for mutually displacing the two upper engagement mechanisms 8,9 in relation to the two lower engagement mechanisms, 6,7, and vice versa. When both of the third telescopic actuators 13,14 are extended, both of the two upper engagement mechanisms 8,9 will be displaced away from the two lower engagement mechanisms 6,7, and vice versa. When both of the third telescopic actuators 13,14 are retracted, both of the upper engagement mechanisms 8,9 will be displaced towards the lower engagement mechanisms 6,7, and vice versa.

In the embodiment shown, the second telescopic actuator 12 is movably mounted to the upper engagement mechanisms 8,9 via hinges allowing the upper engagement mechanisms 8,9 to pivot, however only very limited, around horizontal axes extending transversely in relation to the second telescopic actuator 12. Accordingly, one of the upper engagement mechanisms, 8 or 9, must, along most of any displacement by the third telescopic actuators, be displaced in parallel with and in dependence of any displacement of the other upper engagement mechanism, 9 or 8, and vice versa, when being displaced by the third telescopic actuators 13,14 in relation to the lower engagement mechanisms 6,7.

In an alternative embodiment, the second telescopic actuator 12 is more movably mounted to both the one upper engagement mechanism 8 and the other upper engagement mechanism 9, possibly by means of ball-joint, or by means of a hinged connection with less limited pivotal movement. If that is the case, the one upper engagement mechanism 8 may be displaced individually and independently of the other upper engagement mechanism 9, and vice versa, when being displaced by the third telescopic actuators 13,14 in relation to the lower engagement mechanisms 6,7.

Depending on whether only one of third telescopic actuators, 13 or 14, or both of the third telescopic actuators, 13 and 14, are extended, only one of the upper engagement mechanisms, 8 or 9, or both of the upper engagement mechanisms, 8 and 9, respectively, will be displaced away from the lower engagement mechanisms 6,7.

Depending on whether only one of the third telescopic actuators, 13 or 14, or both of the third telescopic actuators, 13 and 14, are retracted, only one of the upper engagement mechanisms, 8 or 9, or both of the upper engagement mechanisms, 8 and 9, respectively, will be displaced in a direction towards the lower engagement mechanisms 6,7.

Each of the support racks 15,16 of the lower engagement mechanisms 6,7 is movably connected to a reference support 20 via fourth telescopic actuators 21,22. The reference support 20 is the support provided at the front trailer 1 and/or the rear trailer 2. Thus, the reference support 20 may e.g. be a king-pin to be mounted to the trailer. The fourth telescopic actuators 21,22 are intended for displacing the support racks 15,16, and thus the lower engagement mechanisms 6,7, in relation to the reference support 20.

As mentioned earlier, in the embodiment shown, the second telescopic actuator 12 is movably mounted to the upper engagement mechanisms 8,9 around a hinged connection having a limited pivotal movement. Accordingly, one of the lower engagement mechanisms, 6 or 7, must preferably, or necessarily, be displaced in parallel with and in dependence of any displacement of the other lower engagement mechanism, 7 or 6, and vice versa, when being displaced by the fourth telescopic actuators 21,22 in relation to the reference support 20.

In an alternative embodiment, the second telescopic actuator 12 may be more movably mounted to both the one upper engagement mechanism 8 and to the other upper engagement mechanism 9, possibly by means of ball-joint, or by means of a hinged connection with less limited pivotal movement. If that is the case, the support racks 15,16 and thus the lower engagement mechanisms 6,7 may be displaced individually and independently of each other, and vice versa, when being displaced by the fourth telescopic actuators 21,22 in relation to the reference support 20.

In the alternative embodiment, depending on whether only one of the fourth telescopic actuators, 21 or 22, or both of the fourth telescopic actuators, 21 and 22, are extended, only one of the lower engagement mechanisms, 6 or 7, respectively, or both of the lower engagement mechanisms, 6 and 7, respectively, will be displaced in a direction away from the reference support 20.

In the alternative embodiment, depending on whether only one of the fourth telescopic actuators, 21 or 22, or both of the fourth telescopic actuators, 21 and 22, are retracted, only one of the lower engagement mechanisms, 6 or 7, respectively or both of the lower engagement mechanisms, 6 and 7, respectively, will be displaced in a direction towards the reference support 20.

Based on a fixed mutual relationship between the engagement mechanisms 6,7,8,9, i.e. no actuation of the first actuators 10,11, the second actuator 12 and the third actuators 13,14, and based on no actuation of fifth actuators 25,26 (see below), when both of the fourth telescopic actuators 21,22 are retracted, the plane defined by the four engagement mechanisms 6,7,8,9 will tilt around an axis A extending through joints 27,28 where the fifth telescopic actuators 25,26 are joined to the upper engagement mechanisms 8,9.

In alternative embodiment, at least one, preferably both, of the fifth actuators 25,26 are replaced by one or more beams having a fixed length, i.e. one or more beams not capable of being retracted or extended. The fourth actuators 21,22 are still provided so that a displacement of either the one fourth actuator 21 or the other fourth actuator 22, or a differentiated displacement of each of the fourth actuators 21,22 results in the surface defined by the four engagement mechanisms 6,7,8,9 being curved.

If the trailer 1,2 being connected to the reference support 20 is placed on a horizontal ground, the axis A will extend in a horizontal level. However, if the trailer is placed on a non-horizontal ground with the trailer tilting sideways, the axis A will be oblique in relation to a horizontal level. In any of the two situations, i.e. the axis A extending horizontally or obliquely, the axis A will extend perpendicular to a pre-dominant transportation direction T1 of the front trailer 1 or a pre-dominant transportation direction T2 of the rear trailer 2, i.e. a direction in the plane of the paper when viewing the plane view of FIG. 2 and FIG. 3.

Each of the upper engagement mechanisms 8,9 are movably connected to the reference support 20 via fifth telescopic actuators 25,26. The fifth telescopic actuators 25,26 are intended for displacing the upper engagement mechanisms 8,9 in relation to the reference support 20. As mentioned with reference to the above, the reference support 20 is the support provided at the front trailer 1 or the rear trailer 2. Thus, the reference support may e.g. be a king-pin to be mounted to the trailer, or the reference support may be swivelling rim connected to the reference support and the trailer, or the reference support may be a part of a fifth wheel connection between the support system and the trailer, or the reference support may even be part of a spherical element being supported on the trailer or being supported on a loading area of the rear of a hauling truck. Preferably, at least on the rear trailer the reference support is a swivelling rim.

As mentioned earlier, in the embodiment shown, the second telescopic actuator 12 is not movably mounted to the upper engagement mechanisms 8,9. Accordingly, one of the upper engagement mechanisms, 8 or 9, must be displaced in parallel with and in dependence of any displacement of the other engagement mechanism, 9 or 8, and vice versa, when being displaced by the fifth telescopic actuators 25,26 in relation to the reference support 20.

In an alternative embodiment, the second telescopic actuator 12 may be movably mounted to both the one upper engagement mechanism 8 and the other upper engagement mechanism 9. If that is the case, the upper engagement mechanisms 8,9 may be displaced individually and independently of the each other, and vice versa, when being displaced by the fifth telescopic actuators 25,26 in relation to the reference support 20.

Based on a fixed mutual relationship between the engagement mechanisms 6,7,8,9, i.e. no actuation of the first actuators 10,11, the second actuator 12 and the third actuators 13,14, and based on no actuation of fourth actuators 21,22 (see below), when both of the fifth telescopic actuators 25,26 are retracted, the plane defined by the four engagement mechanisms 6,7,8,9 will tilt around an axis B extending through joints 23,24 where the fourth telescopic actuators 21,22 are joined to the support racks 15,16.

In alternative embodiment, at least one, preferably both, of the fourth actuators 21,22 are replaced by one or more beams having a fixed length, i.e. one or more beams not capable of being retracted or extended. The fifth actuators 25,26 are still provided so that a displacement of either the one fifth actuator 25 or the other fifth actuator 26, or a differentiated displacement of each of the fifth actuators 25,26 results in the surface defined by the four engagement mechanisms 6,7,8,9 being curved.

FIG. 6-37 show different individual positions which the embodiment of the individualized support 4,5 according to the invention may take. It is shown in FIG. 6-37 that the individualized support 4,5 according to the invention may be tilted along an axis extending transversely to the plane defined by the four engagement mechanisms 6,7,8,9.

As shown in FIG. 6-9, the first actuators 10,11, the second actuator 12 and the third actuators 13,14 are all fully extended, thereby having the four engagement mechanisms 6,7,8,9 define a large substantially rectangular, plane surface.

As shown in FIG. 10-13, the first actuators 10,11, the second actuator 12 and the third actuators 13,14 are all fully retracted, thereby having the four engagement mechanisms 6,7,8,9 define a small substantially rectangular, plane surface.

As shown in FIG. 14-17, the first actuators 10,11 are fully extended, while the second actuator 12 and the third actuators 13,14 are all fully retracted, thereby having the four engagement mechanisms 6,7,8,9 define a small trapezoidal plane surface having the base line extending downwards.

As shown in FIG. 18-21, the first actuators 10,11 are fully retracted, while the second actuator 12 is fully extended, and the third actuators 13,14 are all fully retracted, thereby having the four engagement mechanisms 6,7,8,9 define a small trapezoidal plane surface having the base line facing upwards.

As shown in FIG. 22-25, the first actuators 10,11 are fully extended and the second actuator 12 is fully extended and the third actuators 13,14 are all fully retracted, thereby having the four engagement mechanisms 6,7,8,9 define a substantially rectangular plane surface having the lower and upper side being substantially larger than the left side and the right side of the substantially rectangular plane surface.

As shown in FIG. 26-29, the first actuators 10,11 are fully retracted and the second actuator 12 is fully retracted, while the third actuators 13,14 are all fully extended, thereby having the four engagement mechanisms 6,7,8,9 define a substantially rectangular plane surface having the left side and the right side being substantially larger than the lower side and the upper side of the substantially rectangular plane surface.

As shown in FIG. 30-33, the first actuators 10,11 are fully extended, while the second actuator 12 is fully retracted and the third actuators 13,14 are all fully extended, thereby having the four engagement mechanisms 6,7,8,9 define a large trapezoidal plane surface having the base line facing downwards.

As shown in FIG. 34-37, the first actuators 10,11 are fully retracted, while the second actuator 12 is fully retracted and the third actuators 13,14 are all fully extended, thereby having the four engagement mechanisms 6,7,8,9 define a large trapezoidal plane surface having the base line facing upwards.

In FIG. 6, FIG. 10, FIG. 14, FIG. 18, FIG. 22, FIG. 26, FIG. 30 and FIG. 34, the two lower engagement mechanisms 6,7 and the two upper engagement mechanisms 8,9 are lying in a vertical plane being extended from the reference support 20 by the both the fourth telescopic actuators 21,22 and fifth telescopic actuators 25,26 being fully extended.

In FIG. 7, FIG. 11, FIG. 15, FIG. 19, FIG. 23, FIG. 27, FIG. 31 and FIG. 35 the two lower engagement mechanisms 6,7 and the two upper engagement mechanisms 8,9 are lying in a rearwards slanted plane by the fifth telescopic actuators 25,26 being partly retracted and the fourth actuators 21,22 being fully extended, thereby tilting the upper part of the plane rearwards around an axis extending through the joints 23,24 between the support racks 15,16 of the lower engagement mechanisms 6,7 and the fourth telescopic actuators 21,22.

In FIG. 8, FIG. 12, FIG. 16, FIG. 20, FIG. 24, FIG. 28, FIG. 32 and FIG. 36, the two lower engagement mechanisms 6,7 and the two upper engagement mechanisms 8,9 are lying in a vertical plane being retracted towards the reference support by the both the fourth telescopic actuators 21,22 and fifth telescopic actuators 25,26 being partly retracted.

In FIG. 9, FIG. 13, FIG. 17, FIG. 21, FIG. 25, FIG. 29, FIG. 33 and FIG. 37, the two lower engagement mechanisms 6,7 and the two upper engagement mechanisms 8,9 are lying in a forwards slanted plane by the fifth telescopic actuators 25,26 being partly extended and the fourth telescopic actuators 21,22 being fully retracted, thereby tilting the upper part of the plane forwards around an axis extending through the joints 23,24 between the support racks 15,16 of lower engagement mechanisms 6,7 and the fourth telescopic actuators 21,22.

All of the above different displacements of two or all of the four engagement mechanisms may be combined in any manner, which is also evident from FIG. 6-37. Thus, the movability of the individualized supports 4,5 according to the invention is optimal in the case, as shown in FIG. 6-37, even where the second telescopic actuator 12 and the knee-joint 19 together with the first telescopic actuators 10,11 are rigidly attached to the engagement mechanisms 6,7,8,9.

Accordingly, an increased movability is obtained for engagement between the four engagement mechanisms and a rigid structure of a wind turbine component to be suspended and transported.

In all of the embodiments shown, the surface defined by the four engagement mechanisms is a plane surface. The second telescopic actuator 12 and the knee-joint 19 together with the first telescopic actuators 10,11 are however possibly movably attached to the engagement mechanisms 6,7,8,9, thereby allowing an individual displacement of only a single lower engagement mechanism, 6 or 7, or only one engagement mechanism, 8 or 9. Thereby, by displacing at least one of the engagement mechanisms 5,6,7,8 in relation to the other, i.e. by displacement of one of the engagement mechanisms out of the plane surface, a curved, non plane surface is formed.

Therefore, the surface defined by the four engagement mechanisms may be a plane surface or a curved, non-plane surface. Curved means non-plane surface, i.e. a continuously or a discontinuously curved surface. Discontinuously curved surface means a surface having a discontinuity such as a curved surface being constructed by two or more planes, where at least two planes are non-parallel.

Because of the joints of the knee-joint 19 with the support racks 15,16 being movable, i.e. being a ball-joint or similar joint which is movable in more than one plane, and if furthermore at least one of the joints of the first telescopic actuators 10,11 with the support racks 15,16 and with the knee-joint 19 are movable, i.e. is a ball-joint or similar joint being movable in more than one plane, and if even further at least one of the joints of the second actuator 12 with the upper engagement mechanisms 8,9 are movable, i.e. is a ball-joint or similar joint being movable in more than one plane, the surface defined by the four engagement mechanisms 6,7,8,9 may be any desirable plane or curved surface.

Accordingly, in such an embodiment, a further increased movability is obtained for engagement between the four engagement mechanisms and a rigid structure of a wind turbine component to be suspended and transported.

The invention claimed is:

1. A support system for a wind turbine component with a rigid structure such as a wind turbine nacelle or a section of a wind turbine tower, said support system comprising:
   an individualised support arranged for being directly or indirectly connected to the rigid structure of said wind turbine component,
   where a plurality of engagement mechanisms of said at least one individualised support define at least four corners of a surface,
   where at least one of said engagement mechanisms is displaceable in relation to a reference support of said at least one individualised support,
   where said surface is tiltable in relation to the reference support,
   where the support system comprises at least four engagement mechanisms, and
   where said surface is capable of forming a curved surface by displacement of at least one engagement mechanism.

2. The support system according to claim 1, where at least two of the plurality of engagement mechanisms are mutually connected via at least one telescopic actuator.

3. The support system according to claim 2, where at least one of the plurality of engagement mechanisms furthermore is connected to the reference support via at least one telescopic support actuator.

4. The support system according to claim 3, where the support system comprises at least two telescopic support actuators, at least one lower telescopic support actuator and at least one upper telescopic support actuator.

5. The support system according to claim 1, where each of the engagement mechanisms is mutually connected to at least one other engagement mechanism by at least one telescopic actuator, and where at least one of the plurality of engagement mechanisms furthermore is connected to the reference support via at least one telescopic support actuator.

6. The support system according to claim 5, where the support system comprises at least two telescopic support actuators, at least one lower telescopic support actuator and at least one upper telescopic support actuator.

7. The support system according to claim 1, where at least two of the plurality of engagement mechanisms, preferably two lower engagement mechanisms, are mutually connected via a knee-joint.

8. The support system according to claim 7, where at least one first telescopic actuator is arranged for operating said knee-joint for thereby displacing the at least two engagement mechanisms in relation to each other.

9. The support system according to claim 8, where said at least one second telescopic actuator is arranged for displacing the at least two engagement mechanisms either towards each other or away from each other.

10. The support system according to claim 1, where at least two of the plurality of engagement mechanisms are mutually connected via at least one second telescopic actuator extending from one of the at least two engagement mechanisms to another of the at least two engagement mechanisms, said at least one second telescopic actuator being arranged for displacing the at least two engagement mechanisms in relation to each other.

11. The support system according to claim 10, where said at least one second telescopic actuator is arranged for displacing the at least two engagement mechanisms either towards each other or away from each other.

12. The support system according to claim 10, where the at least two of the plurality of engagement mechanisms include two upper engagement mechanisms.

13. The support system according to claim 1, where the system comprises upper engagement mechanisms and lower engagement mechanisms connected by telescopic actuators, said telescopic actuators being arranged for displacing the upper engagement mechanisms either towards or away from the lower engagements mechanisms, or vice versa.

14. A support system for a wind turbine component with a rigid structure such as a wind turbine nacelle or a section of a wind turbine tower, said support comprising:
an individualised support arranged for being directly or indirectly connected to the rigid structure of said wind turbine component,
where a plurality of engagement mechanisms of said at least one individualized support defines at least three corners of a surface,
where at least a number of said engagement mechanisms are displaceable in relation to a reference support of said at least one individualised support,
where said surface is tiltable in relation to the reference support,
where the support system comprises only three engagement mechanisms,
where the surface being defined by the at least three engagement mechanisms is a plane surface,
where two of the three engagement mechanisms are mutually connected via a displacement mechanism extending from one of the two engagement mechanisms to the other of the two engagement mechanisms,
where at least one of the plurality of engagement mechanisms furthermore is connected to the reference support via at least one further telescopic actuator, and
where each of the engagement mechanisms are mutually connected to at least one other engagement mechanism via telescopic actuators extending from one engagement mechanism to another engagement mechanism, and where at least one of the plurality of engagement mechanisms furthermore is intended for being connected to the reference support via at least one telescopic support actuator.

15. The support system according to claim 14, where at least two of the engagement mechanisms are mutually connected via at least one telescopic actuator, and where each of the plurality of engagement mechanisms furthermore is intended for being connected to the reference support via at least one telescopic support actuator.

16. The support system according to claim 14, where the support system comprises at least two further telescopic actuator, at least one lower telescopic support actuator and at least one upper telescopic support actuator.

17. The support system according to claim 14, where at least two of the engagement mechanisms are mutually connected via a knee-joint.

18. The support system according to claim 17, where at least one first telescopic actuator is arranged for operating said knee-joint for thereby displacing the at least two engagement mechanisms in relation to each other.

19. The support system according to claim 17, where the at least two of the plurality of engagement mechanisms include two upper engagement mechanisms.

20. The support system according to claim 14, where at least two of the engagement mechanisms are mutually and directly connected via at least one second telescopic actuator, said at least second telescopic actuator being intended for displacing the at least two engagement mechanisms in relation to each other.

21. The support system according to claim 20, where the at least two of the plurality of engagement mechanisms include two upper engagement mechanisms.

22. A vehicle transport system for a wind turbine component with a rigid structure such as a wind turbine nacelle or a section of a wind turbine tower, said vehicle transport system comprising a truck and at least one trailer, and said vehicle transport system furthermore comprising:
at least one individualised support being directly or indirectly connected to the rigid structure of said wind turbine component,
said at least one individualised support furthermore being connected to said at least one trailer in one or more movable connections of a reference support,
where engagement mechanisms of said at least one individualised support define at least three corners of a surface,
where at least a number of said engagement mechanisms are displaceable in relation to a reference support placed on the at least one trailer of the vehicle transport system,
where said surface is tiltable around an axis in relation to the reference support and thus also being tiltable around an axis in relation to the at least one trailer, and
where each of the individualised supports comprises at least four engagement mechanisms, and where the surface is capable of forming a curved surface by displacement of at least one engagement mechanism.

23. The vehicle transport system according to claim 22, where the axis, around which the surface is tiltable, is vertical or oblique and is perpendicular to a forwards transportation direction of the vehicle transport system.

24. The vehicle transport system according to claim 22, where the axis, around which the surface is tiltable, is horizontal or oblique and is parallel to a forwards transportation direction of the vehicle transport system.

25. The vehicle transport system according to claim 22, where the axis, around which the surface is tiltable, is horizontal or oblique, and is perpendicular to a forwards transportation direction of the vehicle.

26. The vehicle transport system according to claim 22, where the axis, around which the surface is tiltable, is oblique, and is oblique to a forwards transportation direction of the vehicle.

27. The vehicle transport system according to claim 22, where said one or more movable connections of the reference support comprises hinged connections between the individualized support and the at least one trailer.

28. The vehicle transport system according to claim 22, where said one or more movable connections of the reference support further comprise at least one support actuator for actuating a displacement of one or more of the engagement mechanisms in relation to the reference support.

29. The vehicle transport system according to claim 22, where said at least one telescopic actuator between the reference support of the trailer and the engagement mechanisms includes at least one telescopic support actuators being movably connected to the at least one trailer and to lower engagement mechanisms of said at least one individualised support.

30. The support system according to claim 29, where the at least one telescopic actuator includes at least two telescopic support actuators.

31. The vehicle transport system according to claim 22, where said at least one telescopic actuator between the reference support of the trailer and the engagement mechanisms includes at least one telescopic support actuators being movably connected to the at least one trailer and to upper engagement mechanisms of said at least one individualised support.

32. The support system according to claim 30, where the at least one telescopic actuator includes at least two telescopic support actuators.

33. The vehicle transport system according to claim 22, where said engagement mechanisms are provided with gripping jaws, which are intended for engaging with a part of the rigid structure of the wind turbine component.

34. The vehicle transport system according to claim 22, where said at least one telescopic actuator is connected to a support rack of the individualised support system, and where said connection is movable so that the support rack is capable of tilting in relation to the at least one telescopic support actuator around at least one of the following axes: a vertical axis and a horizontal axis.

35. A support system for a wind turbine component with a rigid structure such as a wind turbine nacelle or a section of a wind turbine tower, said support comprising
- an individualised support arranged for being directly or indirectly connected to the rigid structure of said wind turbine component,
- where a plurality of engagement mechanisms of said at least one individualized support defines at least three corners of a surface,
- where at least a number of said engagement mechanisms are displaceable in relation to a reference support of said at least one individualised support,
- where said surface is tiltable in relation to the reference support,
- where the support system comprises only three engagement mechanisms,
- where the surface being defined by the at least three engagement mechanisms is a plane surface,
- where two of the three engagement mechanisms are mutually connected via a displacement mechanism extending from one of the two engagement mechanisms to the other of the two engagement mechanisms,
- where at least one of the plurality of engagement mechanisms furthermore is connected to the reference support via at least one further telescopic actuator, and
- where at least two of the engagement mechanisms are mutually connected via at least one telescopic actuator, and where each of the plurality of engagement mechanisms furthermore is intended for being connected to the reference support via at least one telescopic support actuator.

36. A support system for a wind turbine component with a rigid structure such as a wind turbine nacelle or a section of a wind turbine tower, said support comprising
- an individualised support arranged for being directly or indirectly connected to the rigid structure of said wind turbine component,
- where a plurality of engagement mechanisms of said at least one individualized support defines at least three corners of a surface,
- where at least a number of said engagement mechanisms are displaceable in relation to a reference support of said at least one individualised support,
- where said surface is tiltable in relation to the reference support,
- where the support system comprises only three engagement mechanisms,
- where the surface being defined by the at least three engagement mechanisms is a plane surface,
- where two of the three engagement mechanisms are mutually connected via a displacement mechanism extending from one of the two engagement mechanisms to the other of the two engagement mechanisms,
- where at least one of the plurality of engagement mechanisms furthermore is connected to the reference support via at least one further telescopic actuator, and
- where at least two of the engagement mechanisms include two lower engagement mechanisms which are mutually connected via a knee-joint.

37. A support system for a wind turbine component with a rigid structure such as a wind turbine nacelle or a section of a wind turbine tower, said support comprising
- an individualised support arranged for being directly or indirectly connected to the rigid structure of said wind turbine component,
- where a plurality of engagement mechanisms of said at least one individualized support defines at least three corners of a surface,
- where at least a number of said engagement mechanisms are displaceable in relation to a reference support of said at least one individualised support,
- where said surface is tiltable in relation to the reference support,
- where the support system comprises only three engagement mechanisms,
- where the surface being defined by the at least three engagement mechanisms is a plane surface,
- where two of the three engagement mechanisms are mutually connected via a displacement mechanism extending from one of the two engagement mechanisms to the other of the two engagement mechanisms,
- where at least one of the plurality of engagement mechanisms furthermore is connected to the reference support via at least one further telescopic actuator, and
- where at least two of the engagement mechanisms include two upper engagement mechanisms which are mutually and directly connected via at least one second telescopic actuator, said at least second telescopic actuator being intended for displacing the at least two engagement mechanisms in relation to each other.

* * * * *

UNITED STATES PATENT AND TRADEMARK OFFICE
CERTIFICATE OF CORRECTION

| | | |
|---|---|---|
| PATENT NO. | : 8,118,523 B2 | Page 1 of 1 |
| APPLICATION NO. | : 12/528657 | |
| DATED | : February 21, 2012 | |
| INVENTOR(S) | : Gunnar Kamp Storgaard Pedersen | |

It is certified that error appears in the above-identified patent and that said Letters Patent is hereby corrected as shown below:

Column 17, line 7, Claim 32, "The support system according to claim 30, ..." should read --The support system according to claim 31, ...--

Signed and Sealed this
Sixth Day of November, 2012

David J. Kappos
*Director of the United States Patent and Trademark Office*